May 19, 1925.  1,538,001

R. E. PIERCE

CURRENT MEASURING ARRANGEMENT

Filed June 3, 1922

INVENTOR.
R. E. Pierce
BY Ralph W. Wolf.
ATTORNEY

Patented May 19, 1925.

1,538,001

UNITED STATES PATENT OFFICE.

RALPH E. PIERCE, OF LARCHMONT, NEW YORK, ASSIGNOR TO AMERICAN TELEPHONE AND TELEGRAPH COMPANY, A CORPORATION OF NEW YORK.

CURRENT-MEASURING ARRANGEMENT.

Application filed June 3, 1922. Serial No. 565,589.

*To all whom it may concern:*

Be it known that I, RALPH E. PIERCE, a citizen of the United States, residing at Larchmont, in the county of Westchester and State of New York, have invented certain Improvements in Current-Measuring Arrangements, of which the following is a specification.

This invention relates to an improvement in means and arrangements for measuring currents in telegraph circuits.

It is often the practice to include in the telegraph apparatus at a station a current measuring device, such as a mil-ammeter, to indicate the magnitude of the currents transmitted over the circuit to determine whether the telegraph apparatus at the station will function properly, or to determine the condition of balance in the circuit. When the mil-ammeter has been thus utilized in a metallic telegraph circuit, it has heretofore been the practice to connect the operating winding of the mil-ammeter into only one side of the circuit. Under such conditions, particularly when several telegraph circuits are supplied from common battery and operate with "full commutation", i. e. double pole changers, it has been found that the true balance of the currents in the relay windings will not always be indicated, for reasons which will be pointed out in detail hereinafter. The same condition might also exist in cases of "half commutation" with double battery. Accordingly, this invention provides a double differentially wound mil-ammeter with the moving element of the mil-ammeter controlled by windings located in each side of the telegraph circuit. It has been found that with the arrangements of the invention, a true indication of the currents may be obtained under all the circuit conditions which in practice may be met and the variable results and false readings of former arrangements may be obviated. Other features and objects of the invention will appear more fully hereinafter.

Figure 1:
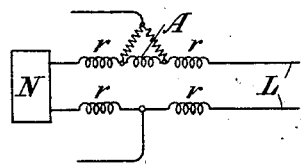
Figure 2:
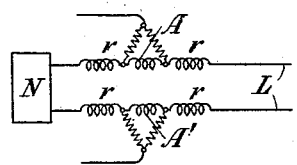
Figure 3:
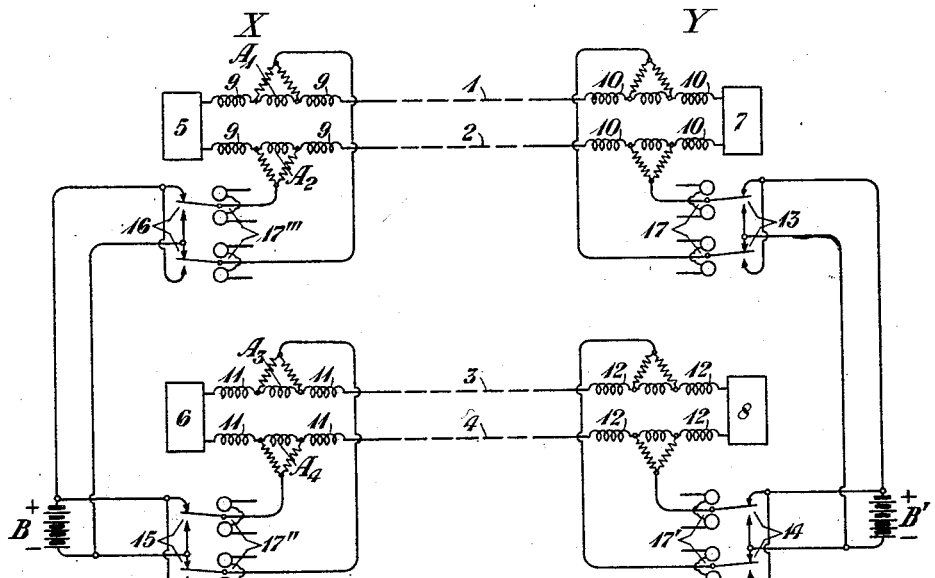
Figure 4:
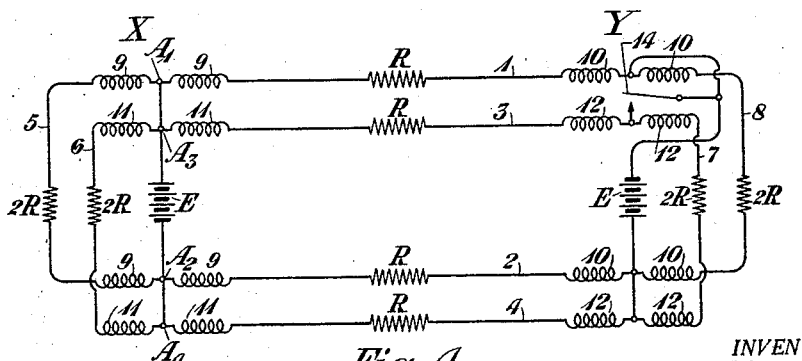

The invention may be more fully understood from the following description together with the accompanying drawing, in the Figures 1, 2, 3 and 4 of which are illustrated the arrangements of the invention. In Fig. 1 is illustrated one of the prior ways in which a mil-ammeter could be connected into a telegraph circuit. Fig. 2 shows the manner in which the mil-ammeter is connected into the circuit in accordance with the principles of this invention. In Fig. 3 is shown a circuit diagram embodying the arrangements of the invention, while in Fig. 4 is shown a schematic diagram illustrating the principles of operation of the invention. Similar reference characters have been utilized to denote like parts in the figures of the drawing.

In Fig. 1 is shown a metallic telegraph line L terminating in a balancing network N. Included in the line L are the windings $r$ of a receiving relay. Connected into one side of the line in the manner shown would be the winding A of a mil-ammeter. Conductors are also illustrated leading to a sending circuit. Such a provision of a mil-ammeter with a single winding connected into one side of the line only illustrates prior arrangements which have proven unsatisfactory in respect to reliability of reading under various circuit conditions, as will be pointed out hereinafter. In Fig. 2 are shown the improved arrangements of the invention, which include the metallic telegraph line L terminating in a balancing network N and including the relay windings $r$. There are also shown conductors leading to a sending circuit. Connected into each side of the telegraph line, as shown, would be the windings A and A' of the meter. These windings are differentially arranged and together operate to control the moving element of the mil-ammeter. With this arrangement a true measurement of the telegraphic currents may be obtained under the various circuit conditions met in practice, as will appear hereinafter.

In Fig. 3 is illustrated in more detail a circuit diagram of the arrangements of the invention. In this figure are two pairs of lines 1, 2 and 3, 4 interconnecting stations at X and Y. Each pair of lines constitutes a metallic circuit and both are supplied from a common battery source, such as B and B'. These metallic circuits are shown as arranged for "full commutation", that is, single battery and double pole changers. The double pole changers are shown at 13 and 14 receiving battery from source B', and 15 and 16 receiving battery from source B. The pole changers 13, 14, 15 and 16 are controlled by the polar relays 17, 17', 17'' and 17''', which are operated by the sending circuits and apparatus in a well known manner. The conductors 1 and 2 terminate at station X in network 5 and the windings 9 of a receiving relay. Connected into each of the conductors 1 and 2 between the relay windings 9 are the differential windings $A_1$ and $A_2$ of a mil-ammeter. At station Y conductors 1 and 2 terminate in relay windings 10 and the network 7. Differential mil-ammeter windings are also provided thereat as shown. Conductors 3 and 4 likewise terminate in network 6 and receiving relay windings 11 and there are provided the mil-ammeter windings $A_3$ and $A_4$. At station Y conductors 3 and 4 terminate in relay windings 12 and the network 8 and there are also provided differential mil-ammeter windings thereat. Other metallic circuits might in like manner be connected to the common batteries B and B' and thus utilized to interconnect stations X and Y.

In Fig. 4 is shown a diagram illustrating schematically the principles of operation of Fig. 3. The telegraph conductors 1 and 2 are shown terminating at stations X and Y in the network circuits 5 and 7 and the relay windings 9 and 10, while the conductors 3 and 4 terminate at stations X and Y in the network circuits 6 and 8 and relay windings 11 and 12. The mil-ammeter windings at station X are indicated positively only by $A_1$, $A_2$, $A_3$ and $A_4$. The resistance of circuits 1, 2, 3 and 4 individually is termed R. The resistance of the network circuits 5, 6, 7 and 8 individually would be 2R. The electromotive force of each of the batteries B and B' is termed E. At station Y one of the contacts of the double pole changer 14 is shown in an open position. All the contacts of the other pole changers may be assumed to be closed.

The principles of operation of the arrangements of the invention are as follows. Let it be assumed that the contact of the double pole changer 14 in Fig. 4 is closed, or, in other words, that all of the contacts of the double pole changers are closed. Let the current in the circuits 1, 2, 3, 4, 5, 6, 7 and 8 be termed respectively $I_1$, $I_2$, $I_3$, $I_4$, $I_5$, $I_6$, $I_7$ and $I_8$. Now $$I_1 = I_2 = \frac{2E}{2R} = \frac{E}{R}$$

$$I_3 = I_4 = \frac{2E}{2R} = \frac{E}{R}$$

$$I_5 = I_6 = \frac{E}{2R}$$

$$I_7 = I_8 = \frac{E}{2R}$$

The current in differential winding $A_1$ equals $$I_1 - I_5 = \frac{E}{R} - \frac{E}{2R} = \frac{E}{2R}$$

and current in differential winding $A_2$ equals $$I_2 - I_5 = \frac{E}{R} - \frac{E}{2R} = \frac{E}{2R}$$

The current then in the differential windings $A_1$ and $A_2$ of the mil-ammeter equals $$A_1 + A_2 = \frac{E}{R}.$$

From the above it will be seen that with all of the pole changer contacts closed, the current in each of the windings $A_1$ and $A_2$ will be the same, or $$\frac{E}{2R}.$$

Accordingly, when all of the pole changer contacts are closed, one of the windings $A_1$ or $A_2$ might well be omitted, and a single winding mil-ammeter with a winding in only one side of the line might be used, as in former arrangements. A true reading would be obtained with such a device, it is admitted, when all of the contacts were closed. Now let it be assumed that after an operation of the pole changers one of the contacts lagged behind the others or remained open, such as is illustrated by the open contact of pole changer 14 of Fig. 4. In other words, assume a condition where all of the pole changer contacts were closed except one of them, as shown. Now $$I_1 = \frac{2E}{R + R/2} = \frac{4E}{3R}$$

$$I_2 = I_4 = \frac{I_1}{2} = \frac{2E}{3R}$$

$$I_5 = I_6 = \frac{E}{2R}$$

$$I_8 = \frac{E}{2R}$$

Now the current in the differential winding $$A_1 = I_1 - I_5 = \frac{4E}{3R} - \frac{E}{2R} = \frac{5E}{6R}$$

and the current in the differential winding $$A_2 = I_2 - I_5 = \frac{2E}{3R} - \frac{E}{2R} = \frac{E}{6R}$$

The current in the mil-ammeter would be indicated by $$A_1+A_2=\frac{5E}{6R}+\frac{E}{6R}=\frac{E}{R}$$

From the above it will be seen that the current in $A_1$ is not the same as the current in $A_2$ when one of the contacts is open as $$A_1=\frac{5E}{6R}$$

and $$A_2=\frac{E}{6R}.$$

It may thus be seen that if only one winding were used, a wide variation in reading might be obtained, depending upon which side of the line this winding was inserted. Accordingly, by utilizing two differential windings, one in each side of the line, such false reading may be obviated and a true reading of the current obtained for all circuit conditions.

While the invention has been illustrated in certain specific arrangements which are deemed desirable, it is understood that it is capable of embodiment in many and widely varied forms without departing from the spirit of the invention as defined in the appended claims.

What is claimed is:

1. A telegraph circuit including a pair of line wires, and a current measuring device comprising a movable indicating element controlled by differentially arranged windings, said windings being included in opposite sides of said telegraph circuit.

2. A plurality of metallic telegraph circuits adapted "full commutation," and mil-ammeters associated with each of said circuits, each of said mil-ammeters comprising a movable indicating element controlled by differentially arranged windings located serially in opposite sides of each of said telegraph circuits.

3. In a telegraph system, a line including a pair of line wires, a balancing network therefor, a receiving relay comprising windings in each of said line wires and windings in the connections extending to said balancing network, a current measuring device including a movable indicating element controlled by differentially arranged windings, each of said differential windings being included between the receiving relay windings in opposite line wires, and a transmitting circuit to neutral points with respect to the windings of said receiving relay and with respect to said differential windings.

In testimony whereof, I have signed my name to this specification this 2nd day of June 1922.

RALPH E. PIERCE.